Patented Sept. 7, 1937

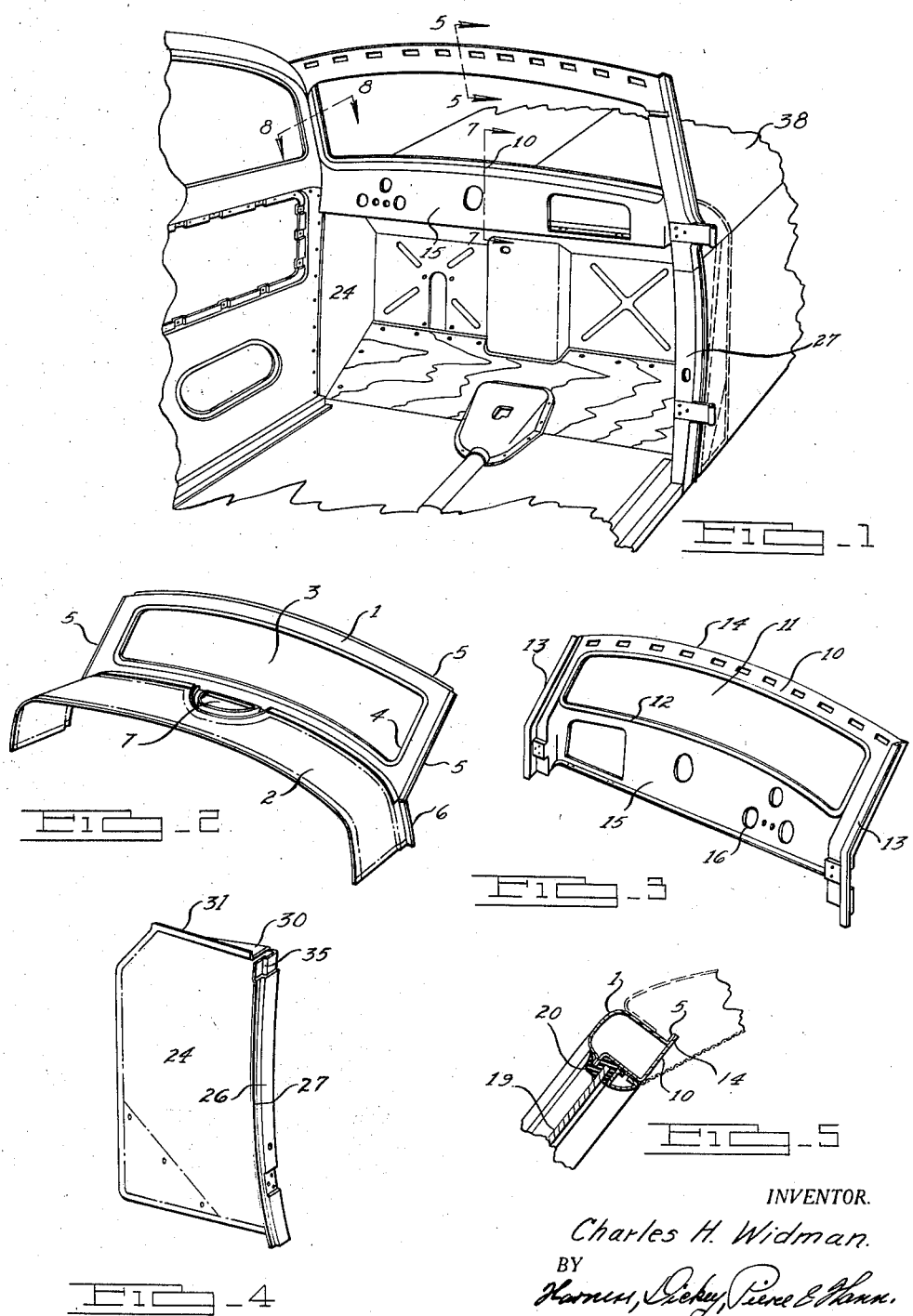

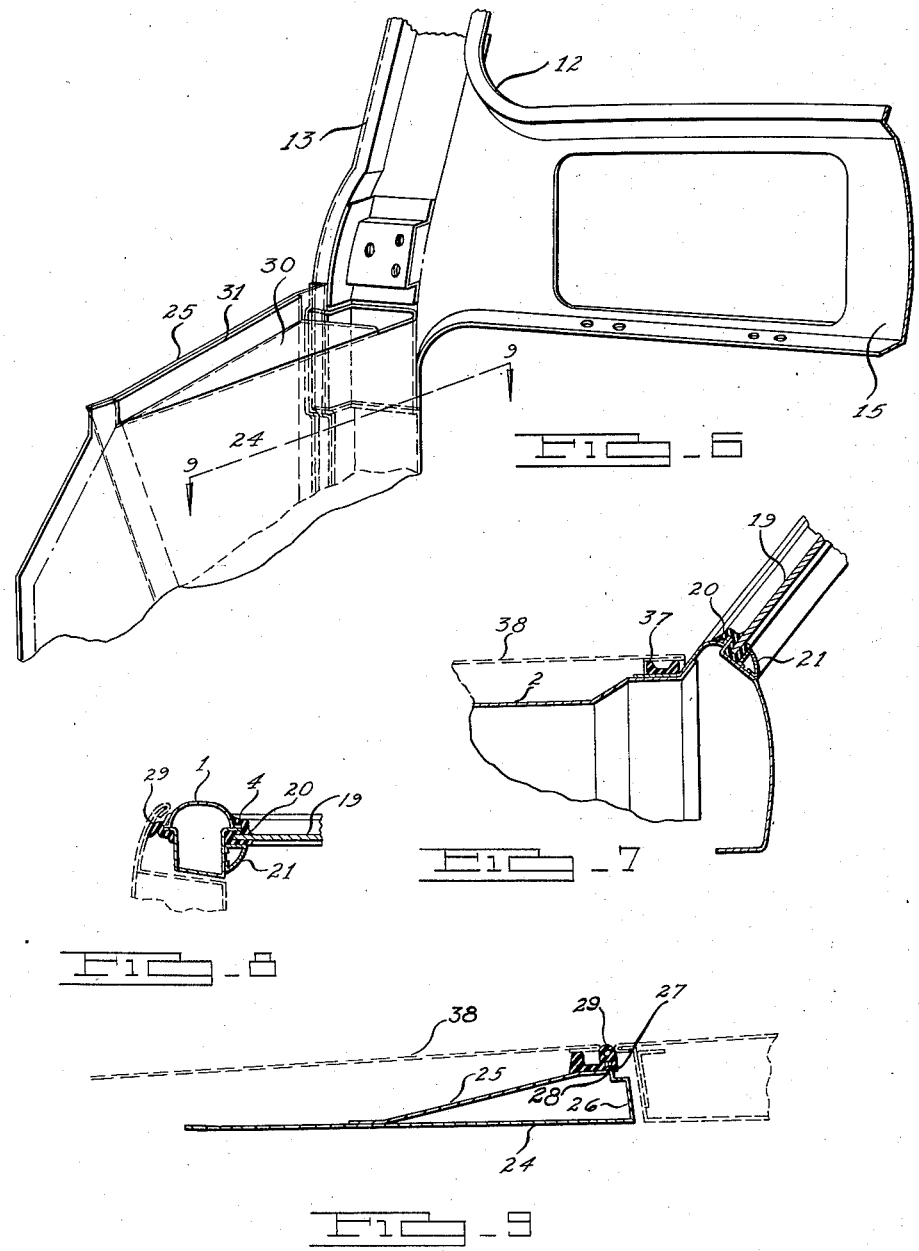

2,092,542

UNITED STATES PATENT OFFICE 2,092,542

COWL CONSTRUCTION

Charles H. Widman, Detroit, Mich., assignor to The Murray Corporation of America, a corporation of Delaware Application November 25, 1935, Serial No. 51,388

6 Claims. (Cl. 296—28)

This invention relates to vehicle body constructions. More particularly, it relates to a cowl and windshield construction adapted for use in all steel sheet metal vehicle bodies.

It is a general object of the present invention to provide a cowl and windshield construction which is relatively simple in form, of attractive appearance and very easily assembled.

The present invention contemplates the provision of a pair of substantially co-extensive sheet metal stampings flanged in their marginal edges and provided with registering windshield openings therein. The stampings are provided with inwardly projecting flanges surrounding the windshield openings and defining the same.

These two stampings are fitted together in telescoping relation and secured together through these inwardly projecting flanges by means of a simple welding operation. The structure thus produced provides a hollow box section on three sides of the window opening of unusual strength and extremely attractive appearance. The inner of the two stampings forming this windshield framing element is provided with a dash board formed integrally therewith and the outer of the two stampings is provided with a cowl top portion formed integrally with the outer stampings. Cowl side members of novel box section are formed from a pair of stampings having mating flanges. One pair of the mating flanges on the cowl side portion forms a substantial continuation of the outer mating flanges by which the windshield stampings are secured together and both pairs of flanges are covered by means of a single attractive finish bead or weather-stripping element, which also serves the purpose of effecting a tight closure with the door of the automobile and adjacent the stampings. The stampings forming the cowl side section are provided with upwardly directed flanges at their upper marginal edges adapted to mate with corresponding flanges on the stampings forming the windshield framing. All of these members may be conveniently and simply secured together by means of welding through these mating flanges, thus providing a strong substantially unitary cowl and windshield construction.

It is a primary object of the present invention to provide a cowl and windshield construction formed of a plurality of mating sheet metal stampings flanged in their marginal edges, the construction of the stampings being such that a minimum number of reverse bending operations are required in the formation of the stampings.

Yet another object of the present invention is to provide a cowl and windshield construction having cowl sides which constitute the reveal portion of the cowl walls interiorly of the body.

Yet another object of the present invention consists in the provision of cowl side members of novel box section which form a substantial continuation of the windshield pillars at the sides of the windshield frame.

A still further object of the present invention consists in a novel front pillar construction which greatly facilitates the assembly of the windshield framing elements, which is provided with mating flanges lying in substantially the same transverse plane.

Still further, the present invention contemplates the provision of a pair of substantially co-extensive stampings, together forming the entire windshield framing, one of the stampings having integrally formed therewith a dash board and the other stamping having formed thereon a cowl top, both of said stampings being provided at their side marginal edges with out-turned flanges adapted to mate with similar out-turned flanges on the other stamping and adapted to be secured together through these mating flanges.

Many other and further objects of the present invention will become apparent from a consideration of the following specification when taken in connection with the accompanying drawings forming a part thereof.

In the drawings:

Figure 1 is a fragmentary perspective view from the interior of the vehicle body showing the improved cowl and windshield construction.

Figure 2 is a perspective view of the outer windshield framing element showing the cowl top formed integrally therewith.

Figure 3 shows a perspective view of the inner windshield framing section with the dash board formed integrally therewith.

Figure 4 is a perspective view of one of the outer side cowl sections.

Figure 5 is an enlarged sectional view taken on the line 5—5 of Figure 1 showing the structure of the upper windshield header and the manner in which the top mates therewith.

Figure 6 is an enlarged fragmentary perspective view of the upper end of one of the side cowl sections showing the manner in which the inner windshield framing panel is secured thereto.

Figure 7 is a sectional view taken on the line 7—7 of Figure 1 showing the manner in which the hood mates with the cowl top of the outer windshield framing panel.

Figure 8 is a transverse sectional view taken on the line 8—8 of Figure 1 showing in detail the structure of one of the windshield pillars and the manner in which the front door mates therewith.

Figure 9 is a transverse sectional view taken on the line 9—9 of Figure 6 showing the structure of the cowl side members and the manner in which the front door and hood mate therewith.

With more particular reference to the drawings, the improved windshield and cowl construction comprises an outer windshield framing panel 1 preferably formed of a single integral sheet metal stamping and having a cowl top 2 formed integrally therewith. This stamping has a windshield opening 3 therein and is provided around the windshield opening with an inturned flange 4 extending completely around the opening and lying substantially in the plane thereof. Along the top and down the lateral side edges, this stamping is provided with an out-turned flange 5 lying in substantially the same plane or a parallel plane with the flange 4 surrouding the windshield opening. The cowl top 2 is provided at its rear edges with flanges 6 which constitute substantially integral continuations of the flanges 5. The cowl top may, in its central portion, be provided with a suitable aperture 7 to provide a cowl ventilator as is conventional in the art.

The windshield framing element has adapted to mate therewith an inner stamping generally designated as 10. This inner stamping 10 has a windshield opening 11 formed therein which is identically the same size and is adapted to register with the windshield opening 3 in the outer windshield framing section. An integrally formed inwardly projecting flange 12 extends completely around the opening 11 and is adapted to mate with the flange 4 surrounding the windshield opening in the outer windshield framing panel. This inner windshield framing panel is at its side marginal edges provided with suitable out-turned flanges 13 which are adapted to mate with the out-turned flanges 5 and 6 and is provided along its top with an out-turned flange 14 adapted to mate with the flange 5 along the top of the outer windshield framing panel. A suitable vertically disposed dashboard 15 is preferably formed integrally with the inner windshield framing panel 10 and has suitable openings 16 therein to facilitate the mounting of instruments.

From the foregoing, it will be appreciated that when these inner and outer windshield framing panels are telescopically positioned, the flange 12 surrounding the windshield opening will mate with the flange 4 and the flanges 13 and 14 will mate with the flanges 5 and 6. It will therefore be appreciated that these two panels may be secured together by a simple spot welding operation through these flanges and will, when secured together, provide a strong structure having a hollow box section at the top, constituting a windshield header and hollow box section pillars at each of the lateral sides thereof. The inwardly projecting mating flanges 4 and 12 will together form one wall of a rabbet in which a windshield may be seated by means of a suitable resilient framing element 20 which extends around the windshield opening and which may be retained in place by a conventional rectangular garnish molding element 21.

The cowl sides are each preferably formed of a pair of inner and outer stampings 24 and 25 respectively. The inner of these stampings 24 forms the inner wall of the cowling and has a laterally bent portion 26 adapted to form the jamb face of the front door frame substantially in continuation of the jamb face of the front door frame formed by the inner windshield framing panel. This jamb face portion 26 is offset and provided with a vertically extending outwardly projecting flange 27 adapted to mate with a suitable corresponding flange 28 formed on the outer cowl panel 25. The forward portions of the cowl sections 24 and 25 are provided with suitable mating surfaces which may be secured together by spot welding. The mating flanges 27 and 28 may be covered by a suitable weatherstripping element 29 which serves to provide a finish for this pair of outwardly projecting flanges and has a portion which forms a resilient seat for the rear marginal edge of a hood adapted to cover the cowling and has a resilient portion adapted to be engaged by the flange of the door when in closed position. It will be appreciated that these outwardly projecting flanges 27 and 28 together form a substantial continuation of the mating flanges 13 and 6 on the cowl top and inner windshield framing panel respectively. The weatherstripping element 29 is somewhat modified in form in its upper portion and serves to cover the mating flanges 13, 5 and 6.

The inner cowl side panel 24 is bent over at the top to provide a triangular portion 30 which serves to close the upper end of the box section formed by the cowl side panel members and is provided at its marginal edge with an upwardly turned flange 31 adapted to mate with the outer cowling panel 25. These two mating flanges are secured together and together provide an upstanding flange adapted to mate with the terminal edge of the cowl top 2. The upper end of the jamb face portion of the cowl panel 24 is offset inwardly to provide an upwardly projecting flange portion 35 adapted to mate with a corresponding portion at the lower terminal edge of the windshield framing panel 10.

From the foregoing it will be appreciated that the windshield and cowling structure provided is relatively simple, exceedingly strong and very easily assembled. It will be appreciated that all parts thereof may be simply secured together by means of spot welding operations through the mating flanges and that in each instance these mating flanges are covered by means of suitable weatherstripping elements to provide an attractive surface finish. A weatherstripping element 37 may be secured in position across the cowl top to cooperate with the lower portion of the weatherstripping element 29 to provide a resilient seat for the rear terminal edge of a hood 38.

It will be appreciated that many other and further modifications of the invention disclosed herein falling within the scope of the subjoined claims will be apparent to those skilled in the art.

What is claimed is:

1. A cowl construction comprising a pair of cowl sides of hollow box section, said cowl sides being closed at the top and provided with upstanding flanges, and a cowl top supported by said cowl sides and having flanges adapted to mate with said upstanding flanges.

2. In a vehicle body construction a cowl side member including a pair of inner and outer sheet metal panels secured together to provide a structure of substantially triangular hollow box section, the inner panel being offset and flanged to mate with the outer panel to close the upper end of the box section structure.

3. In a vehicle body construction, a cowl side member and a cowl top, said cowl side member including inner and outer sheet metal panels secured together to provide a structure of substantially triangular hollow box section, the inner of said panels being offset and flanged in its upper marginal edge to close the upper end of said box section structure, the marginal edge of said cowl top being secured to said mating flanges.

4. In a vehicle body construction a cowl side member comprising inner and outer sheet metal stampings secured together to provide a structure of hollow substantially triangular box section, the inner of said stampings being preformed to provide a portion of a jamb face of a door opening and being flanged outwardly in its marginal edge to mate with a complemental flange on said outer stamping.

5. In a vehicle body construction a cowl side member comprising inner and outer sheet metal stampings secured together to provide a structure of hollow substantially triangular box section, the inner of said stampings being preformed to provide a portion of a jamb face of a door opening and being flanged outwardly in its marginal edge to mate with a complemental flange on said outer stamping, and a resilient hood supporting finish strip supported on said mating flanges.

6. In a vehicle body construction a cowl side member comprising inner and outer stampings secured together to provide a structure of hollow substantially triangular box section said inner stamping being preformed to provide the lower portion of the jamb face of a door opening and being offset to close the top of said box section structure.

CHARLES H. WIDMAN.